US008627480B2

(12) United States Patent
Scheiblhofer et al.

(10) Patent No.: US 8,627,480 B2
(45) Date of Patent: Jan. 7, 2014

(54) COMPILER AND METHOD FOR COMPILING

(75) Inventors: Dietmar Scheiblhofer, Kaindorf (AT); Franz Klug, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1604 days.

(21) Appl. No.: 11/539,198

(22) Filed: Oct. 6, 2006

(65) Prior Publication Data

US 2007/0133789 A1 Jun. 14, 2007

(30) Foreign Application Priority Data

Oct. 6, 2005 (DE) .......................... 10 2005 048 029

(51) Int. Cl.
*G06F 7/04* (2006.01)

(52) U.S. Cl.
USPC .............................................. 726/26; 380/28

(58) Field of Classification Search
USPC .......................................................... 380/28
See application file for complete search history.

(56) References Cited

U.S. PATENT DOCUMENTS

| 4,961,225 | A | * | 10/1990 | Hisano ............................. 380/28 |
| 4,979,832 | A | * | 12/1990 | Ritter ............................... 380/28 |
| 6,158,048 | A | * | 12/2000 | Lueh et al. ....................... 717/118 |
| 6,199,152 | B1 | * | 3/2001 | Kelly et al. ....................... 711/207 |
| 6,301,647 | B1 | * | 10/2001 | Green ............................... 711/207 |
| 6,351,797 | B1 | * | 2/2002 | Beard et al. ...................... 711/207 |
| 6,704,925 | B1 | * | 3/2004 | Bugnion .......................... 717/138 |
| 7,219,239 | B1 | * | 5/2007 | Njemanze et al. ................. 726/3 |
| 7,500,115 | B2 | * | 3/2009 | Berke et al. ..................... 713/300 |
| 7,555,780 | B2 | * | 6/2009 | Tucker et al. .................... 726/26 |
| 7,996,671 | B2 | * | 8/2011 | Chheda et al. .................. 713/164 |
| 2002/0091734 | A1 | * | 7/2002 | Redlich et al. ................... 707/511 |
| 2003/0191942 | A1 | * | 10/2003 | Sinha et al. ..................... 713/181 |
| 2004/0177243 | A1 | * | 9/2004 | Worley, Jr. ........................ 713/2 |
| 2005/0180563 | A1 | * | 8/2005 | Apostolopoulos et al. ..... 380/28 |

FOREIGN PATENT DOCUMENTS

EP 0858039 A2 12/1998

OTHER PUBLICATIONS

IBM; "C for AIX Compiler Reference"; May 2002 Edition.
Hennesy, J.L. et al.; Computer Organization and Design. 2nd edition. Morgan Kaufmann Publishers, Inc. 1998, pp. 552, 553.

* cited by examiner

*Primary Examiner* — Amare F Tabor
(74) *Attorney, Agent, or Firm* — Schiff Hardin LLP

(57) ABSTRACT

A compiling device for generating a second program sequence from a first program sequence comprises a recognizer for recognizing a first subarea and a second subarea of the first program sequence, and a selector for selecting instructions from a set of instructions of the second program sequence formed to select only instructions of a first security category for mapping a functionality of the first subarea and to select instructions of the second security category for mapping a functionality of the second subarea. Additionally, the compiling device comprises a generator for generating the second program sequence from the instructions selected.

23 Claims, 3 Drawing Sheets

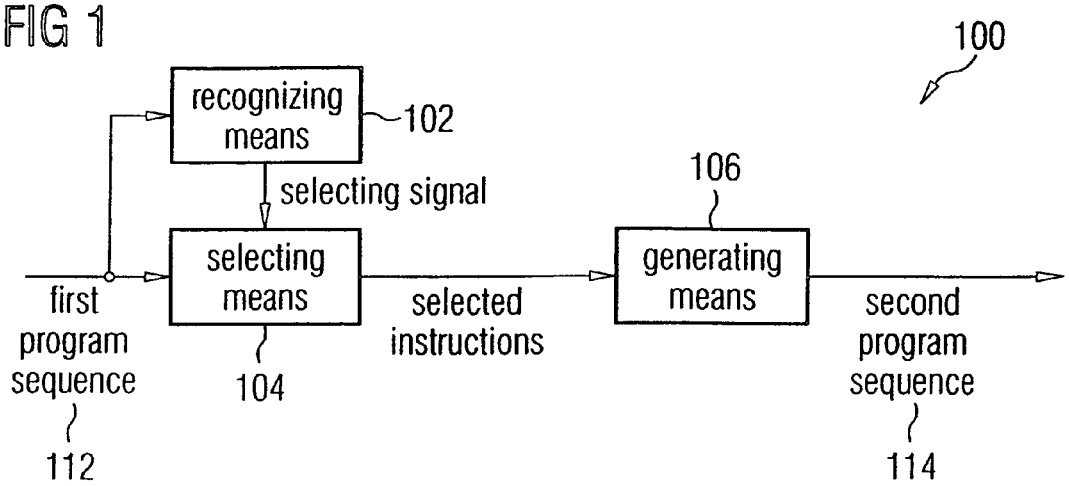
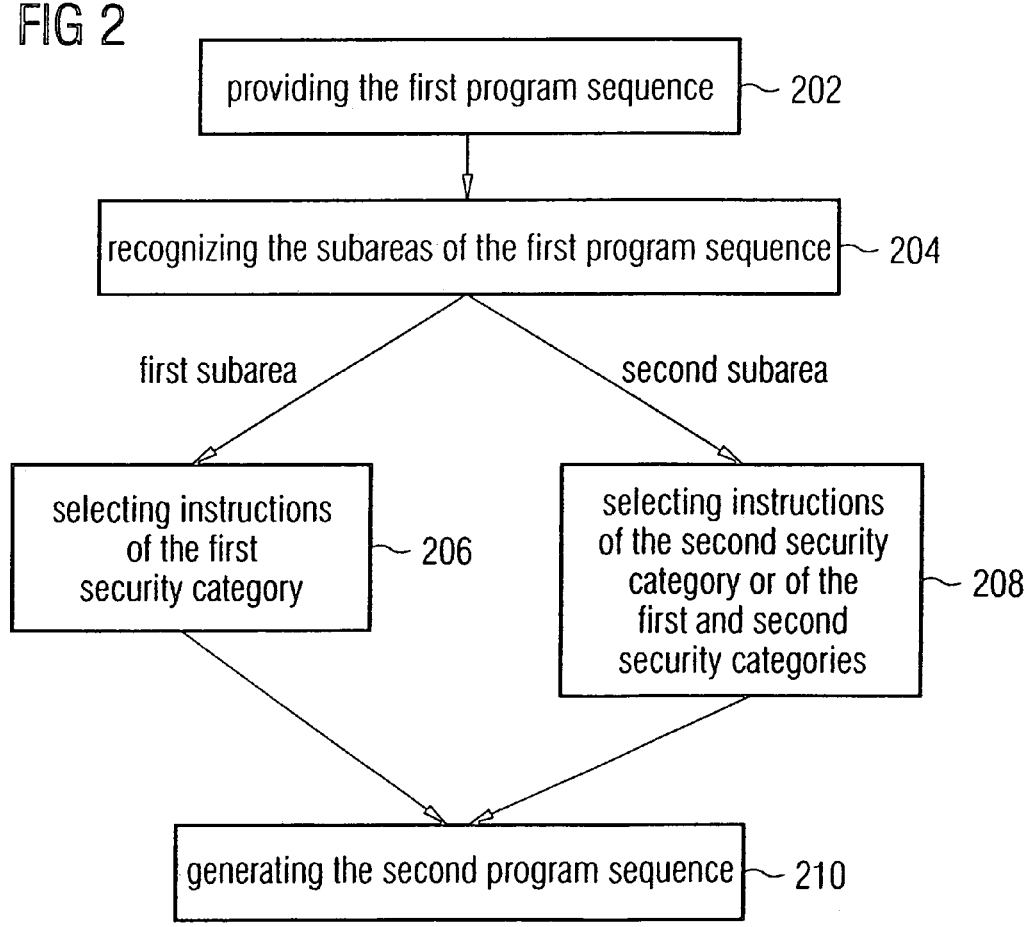

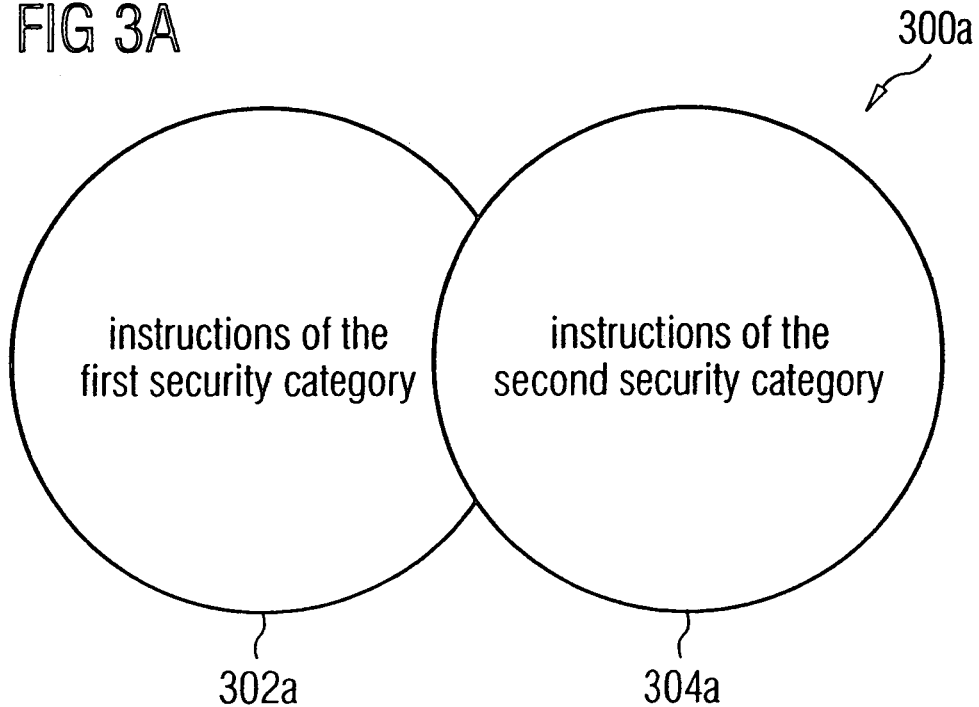
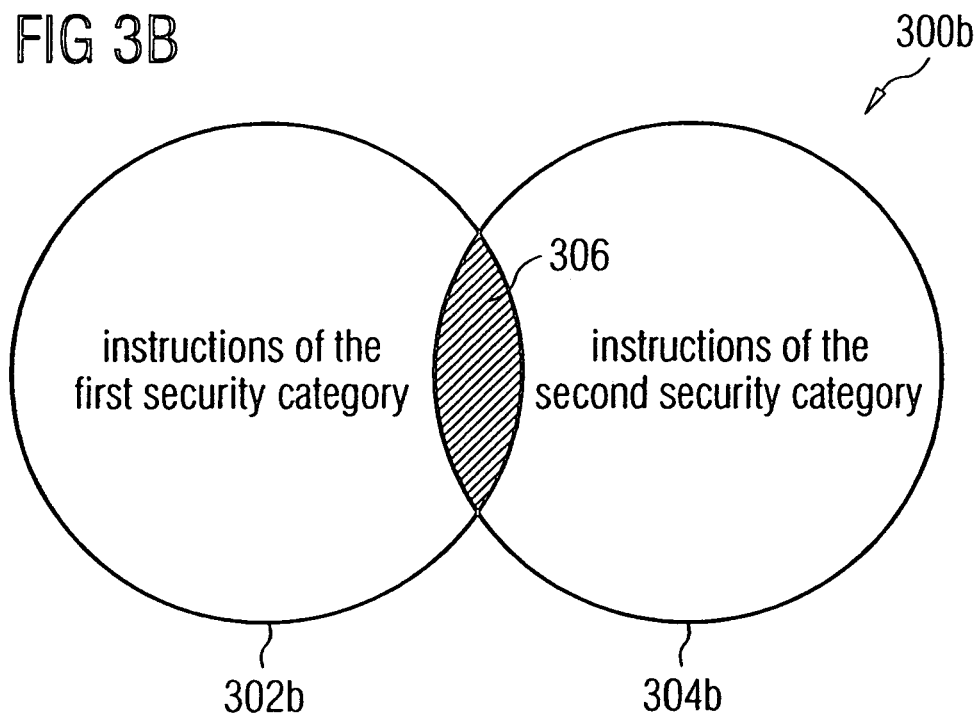

COMPILER AND METHOD FOR COMPILING

CROSS-REFERENCE TO RELATED APPLICATION

This application claims priority from German Patent Application No. 10 2005 048 029.2, which was filed on Oct. 6, 2005, and is incorporated herein by reference in its entirety.

BACKGROUND

1. Field of the Application

The application relates to a compiler and to a method for compiling as is in particular used for security-relevant fields.

2. Description of Related Art

It is possible by hardware errors or most different attack methods to interfere with the function of a processor. Attack methods of this kind may, for example, be realized using light or by probing. Plenty of protection mechanisms which are to prevent an attacker or error to cause an incorrect flow of programs are provided in software or hardware.

DESCRIPTION OF THE DRAWINGS

Exemplary embodiments of the present application will be detailed subsequently referring to the appended drawings, in which:

FIG. 1 shows a compiler according to an exemplary embodiment;

FIG. 2 is a flow chart of a method for compiling according to an exemplary embodiment;

FIGS. 3a and 3b are volume representations of sets of instructions according to exemplary embodiments.

DESCRIPTION

Figure 4:
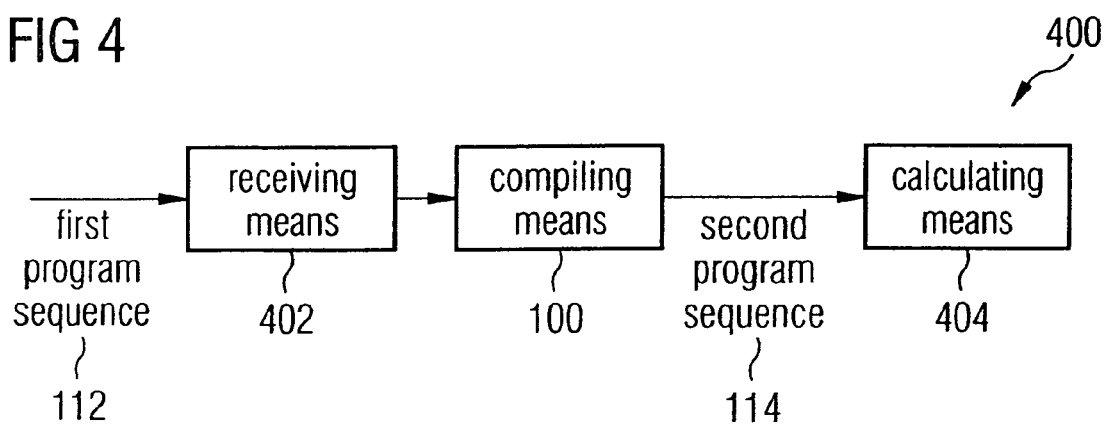
FIG. 4 is a block circuit diagram of a processor according to an exemplary embodiment.

In accordance with a first aspect, the application provides a compiler for generating a second program sequence from a first program sequence, the first program sequence comprising a first subarea of a first security level and a second subarea of a second security level distinguishable from the first subarea by at least an indicator, comprising: recognizing means for recognizing the first subarea of the first program sequence and the second subarea by means of the at least one indicator; selecting means for selecting instructions from a set of instructions of the second program sequence to map a functionality of the first program sequence to the second program sequence, the set of instructions comprising instructions of a first security category and instructions of a second security category, and the selecting means being formed to select only instructions of the first security category for mapping a functionality of the first subarea and to select instructions of the second security category or the first and second security categories for mapping a functionality of the second subarea; and generating means for generating the second program sequence from the instructions selected by the selecting means.

In accordance with a second aspect, the application provides a method for generating a second program sequence from a first program sequence, comprising the steps of: providing the first program sequence, the first program sequence comprising a first subarea of a first security level and a second subarea of a second security level distinguishable from the first subarea by at least an indicator; recognizing the first subarea of the first program sequence and the second subarea by means of the at least one indicator; selecting instructions from a set of instructions of the second program sequence to map a functionality of the first program sequence to the second program sequence, the set of instructions comprising instructions of a first security category and instructions of a second security category, wherein only instructions of the first security category are selected for mapping a functionality of the first subarea and instructions of the second security category or the first and second security categories are selected for mapping a functionality of the second subarea; and generating the second program sequence from the instructions selected by the selecting means.

In accordance with a third aspect, the application provides a computer program having a program code for performing the method as mentioned above, when the computer program runs on a computer.

The application is based on the finding that there are areas in a program which are more critical as to security than other areas. The security classification may take place from a security point of view and from a point of view of considering efficient performance of attacks to a program flow. Exemplarily, the first security level according to the application may be associated with an area of the first program sequence which necessitates high security requirements due to a critical functionality, and the second security level may be associated with a subarea which necessitates lower security requirements due to an uncritical functionality.

The second program sequence may, for example, be a sequence of assembler instructions. From a security point of view, the instructions of the second program code, that is, for example, the assembler instructions, are not security-critical to the same extent. Although in principle any instruction may be interfered with anyhow, such as, for example, by spiking or radiation, an attacker will rather tackle deterministic attack scenarios as long as they can be performed efficiently, since this results in easy reproducibility. This is by far a more practical way for attacks seeking a certain result. Typically, deterministic attacks of this kind can be triggered in a well-controlled manner by light, such as, for example, local light. Primarily, regular structures, such as, for example, a register file RAM, are the target of a local attack. If two different jump instructions, such as, for example, a relative jump, like PC=PC+20, and an indirect jump, like PC=REGISTER, are considered, the following situation will arise. With a relative jump where the jump target is determined by the OP code, a successful deterministic attack, like by local light, is considerably less critical than in an indirect jump. This results from the fact that well-aimed manipulating a register by means of light is much easier than altering an OP code of an instruction. As far as the application is concerned, a relative jump instruction is exemplarily classified as an uncritical instruction of the first security category and an indirect jump as a critical instruction of the second security category.

The application is thus based on the finding that it is of advantage to cluster both a program sequence and a set of instructions from a security point of view. Clustering of this kind may, for example, be performed by, on the one hand, classifying the program sequences into critical code and uncritical code and classifying, on the other hand, the instruction set into critical instructions and uncritical instructions:

program sequence: critical code-uncritical code set of instructions: critical instruction-uncritical instruction According to the application, the usage of critical instructions is limited to those code areas considered to be uncritical. Thus, it is for example prevented in a manner supported by tools that critical instructions are used in critical code areas, increasing general protection against attackers for this area.

The approach used so far where there was no security differentiation between the instructions of a microcontroller is thus abandoned.

The method allows a selective classification, controllable by the customer, of parts of the program code and the data. The measure will not represent absolute protection against attacks to program codes or individual instructions. However, by using uncritical instructions, the obstacle for an attack to a critical routine is increased. The limitation of the functionality enhances security against local attacks for a customer.

Preferably, the method can be combined with other measures, such as, for example, EDC, to offer additional protection from global and deterministic attacks. Attacks of this kind may, for example, be provoked by spikes.

FIG. 1 shows a compiler 100 according to an embodiment of the application. The compiler 100 comprises recognizing means 102, selecting means 104 and generating means 106. The compiler 100 is formed to receive a first program sequence 112 and to output a second program sequence 114.

The first program sequence 112 may be a high-level language program, such as, for example, a C program. The first program sequence 112 contains the description of a certain functionality. The second program sequence 114 may be a machine program executable by a processor. Exemplarily, the second program sequence 114 may represent an assembler program. The compiler 100 is formed to generate the second program sequence 114 from the first program sequence 112. Thus, the first program sequence 112 is mapped to the second program sequence 114 such that the second program sequence 114 contains the same functionality described in the first program sequence 112.

According to the iapplication, the first program sequence 112 may be divided into subareas to which different security requirements are associated. Exemplarily, a first subarea of a first security level may be an encryption algorithm or decryption algorithm and a second subarea of a second security level may be a subarea defining a data reception routine, exemplarily from an UART. In this case, executing the encryption/decryption algorithm is more security-critical than executing the data reception routine. Correspondingly, the first subarea has a critical functionality having high security requirements and the second subarea has an uncritical functionality having lower security requirements. The first program sequence 112 may comprise indicators to identify the subareas and/or the security levels associated with the subareas. Exemplarily, a first indicator may be associated with the first security level and a second indicator may be associated with the second security level. The indicator may be a mark, such as, for example, in the form of a word, an instruction or an individual bit, which is exemplarily arranged at the beginning of a subarea and is evaluated by the compiler 100. Alternatively, each individual instruction of a subarea of the first program sequence may be marked by a corresponding indicator, or else only one respective special subarea, such as, for example, the first subarea, is marked, but not another subarea. The first program sequence 112 may comprise a plurality of subareas which may be first subareas of a first security level, second subareas of a second security level or other subareas of other definable security levels.

According to this embodiment, the first program sequence 112 is provided to both the recognizing means 102 and the selecting means 104. The recognizing means 102 is formed to recognize the security levels of the respective subareas. This may take place by means of the indicators. According to this embodiment, the recognizing means 102 provides a selection signal to the selecting means 104 indicating to the selecting means whether a subarea received in the first program sequence 112 is a first subarea of the first security level or a second subarea of the second security level.

The selecting means 104 is formed to select instructions from a set of instructions. The set of instructions thus is a set of instructions on which the second program sequence 114 is based. If the second program sequence 114 is a machine code which may run on a processor, the set of instructions will be the set of instructions of this processor. The instructions selected map the functionality of the first program sequence 112 to the second program sequence 114.

According to the application, the instructions of the set of instructions are classified into different security categories. According to this embodiment, the set of instructions comprises instructions of a first security category and instructions of a second security category. The instructions of the first security category may be secure instructions which are, for example, less susceptible to deterministic attacks than the instructions of the second security category. Depending on whether the subarea of the first program sequence 112 is a first subarea of the first security level or a second subarea of the second security level, the selecting means 104 will select either instructions of the first security category or instructions of the second security category. For mapping a functionality of the first subarea of the first security level, the selecting means 104 will, according to the application, select exclusively instructions of the first security category. For mapping a functionality of the second subarea of the second security level, either instructions of the second security category only or instructions of the first and second security categories may be selected.

The instructions selected for mapping the first program sequence 112 are provided by the selecting means 104 to the generating means 106. The generating means 106 is formed to generate the second program sequence 114 from the instructions selected. Exemplarily, the generating means 106 may be formed to output the selected instructions received in the received order as the second program sequence 114. Alternatively, the selected instructions may be transformed by the generating means 106 to a format required for the second program sequence 114.

The compiler shown in FIG. 1 is based on the application of classifying the instructions, such as, for example, the assembler instructions of a microcontroller, into different risk or security classes. The compiler 100 makes sure that only those instructions corresponding to the security level required are allowed for code areas to be protected especially. The code areas may, for example, be functional blocks or functions. The corresponding security levels may be established by a programmer of the first program sequence 112 or, alternatively, by software users. This is of advantage since the security levels may differ depending on the field in which the program sequences are applied.

In addition, using the security levels allows implicit alteration of the performance of an element in a manner transparent for the customer by means of tool support to enhance the security standard. This allows implicit support of hardware features. If the hardware system on which the second program sequence 114 is executed includes a cache which can only be protected against local attacks insufficiently but supports a write through mechanism, using keywords or indicators may be used to implicitly trigger secure behavior for this module. In the case of a cache, this might be not to store critical data in the cache but to pass on and process the data directly to the CPU. This implicit protection by means of a keyword would, for example, result in special control of the cache by means of SFR (special function register) instructions. This, however, would be transparent for a user who is thus less dependent on the platform. This only entails a loss in performance and/or an increase in the overall energy consumption of the application when this data not arranged in the cache is accessed frequently.

In the programming language C, the code area to be protected may be identified by a special keyword.

Exemplarily, Void_secure ENCRYPT (char*data).

The keyword_secure ensures that, when compiling this function, only assembler instructions considered to be secure are used. It could also be conceivable for the assembler instructions to be classified into several security classes. This corresponds to finer a clustering of both the program sequence and the set of instructions. In this case a security level may for example be required for a certain function.

Exemplarily, Void_secure_level (3) ENCRYPT (char*data).

To allow support of special hardware functions, the compiler shown in FIG. 1 may, for example, comprise an additional inserting device (not shown in the figures) formed to insert an additional instruction into the second program sequence when recognizing the first indicator. This additional instruction may allow enabling the special type of the function. This may, for example, be enabling or disabling temporary storage, like a cache. Expressed generally, the additional instruction in executing means suitable for executing the second program sequence may enable a secure mode ensuring execution of a subarea of the second program sequence corresponding to the subarea of the first program sequence to be protected from attacks as far as possible.

FIG. 2 shows a flow chart illustrating individual method steps of a method for compiling. The first program sequence is provided in a first step 202. The first program sequence may be the program sequence 112 shown in FIG. 1 comprising a first subarea to which a high security level is associated and a second subarea to which a lower security level is associated.

In a second method step 204, the subareas of the first program sequence are recognized. If a first subarea is recognized, selecting instructions of the first security category will take place in a third step 206 to represent a functionality of the first subarea. If, however, this is a second subarea, selecting instructions of the second security category or the first and second security categories will take place in a parallel third step 208 to realize the functionality of the second subarea.

In a fourth step 210, the second program sequence is generated from the instructions selected in steps 206, 208. The method shown in FIG. 2 may, for example, be executed by the compiler 100 shown in FIG. 1.

FIGS. 3a and 3b show embodiments of sets of instructions according to the application. According to the embodiment shown in FIG. 3a, a set of instructions 300a comprises a first subset of instructions of the first security category 302a and a second subset of instructions of the second security categories 304a. The two subsets do not overlap. If possible, either an instruction of the first security category or an instruction of the security category may be associated with each functionality to be realized. If no instructions of the first security category can be associated with a functionality, this functionality can either not be realized by the compiler or an instruction of the second security category is resorted to. This, however, would be of disadvantage in that the security of the program to be executed would be reduced since a critical instruction of the second security category has to be used for a critical code area. Both instructions of the first security category and instructions of the second security category can be used to realize uncritical code areas. Preferably, that instruction ensuring the easiest realization, the fastest program flow or the smallest energy consumption will be selected to realize uncritical code areas.

Alternatively, the set of instructions shown may be divided into further subsets. This allows finer grading of the security categories. In such a case, the first program sequence may comprise further subareas of further security levels identified by further indicators. Additionally, the recognizing means shown in FIG. 1 may be formed to recognize the further subareas by means of further indicators and the selecting means may be formed to select instructions of the further security categories for mapping a functionality of the further subareas.

According to the embodiment shown in FIG. 3b, a set of instructions 300b comprises subsets of instructions of the first security category 302b and instructions of the second security category 304b overlapping in an overlap region 306. Instructions for which there is no alternative instruction in the respective other security category are arranged in the overlap zone 306. If the compiler resorts to such instructions in the overlap set 306, this will be of disadvantage since such instructions may be critical instructions which should actually not be used for realizing critical code areas.

Depending on the circumstances, the method for generating a second program sequence from a first program sequence may be implemented in either hardware or software. The implementation may be on a digital storage medium, in particular on a disc or CD having control signals which may be read out electronically which can cooperate with a programmable computer system such that the corresponding message will be executed. Generally, the application thus also is in a computer program product having a program code stored on a machine-readable carrier for performing the method when the computer program product runs on a computer. Put differently, the application may thus also be realized as a computer program having a program code for performing the method when the computer program runs on a computer.

According to an embodiment, the compiling means 100 shown in FIG. 1 may be implemented directly in a processor. FIG. 4 shows such a processor or microcontroller 400 having receiving means 402 in the compiling means 100 and calculating means 404. The receiving means 402 is formed to receive the first program sequence 112 and provide it to the compiling means 100. The compiling means 100 is formed to generate the second program sequence 114 from the first program sequence 112 and provide it to the calculating means 404. The calculating means 404 is formed to execute the instructions of the second program sequence 114. According to this embodiment, the set of instructions used by the selecting means of the compiling means 100 is a machine set of instructions on which the calculating means 404 is based.

While this application has been described in terms of several preferred embodiments, there are alterations, permutations, and equivalents which fall within the scope of this application. It should also be noted that there are many alternative ways of implementing the methods and compositions of the application. It is therefore intended that the following appended claims be interpreted as including all such alterations, permutations, and equivalents as fall within the true spirit and scope of the application.

The invention claimed is:

1. A compiler for generating a second computer program sequence being a machine program executable by a processor, from a first computer program sequence, the first computer program sequence comprising a first subarea of a first security level and a second subarea of a second security level distinguishable from the first subarea by at least one indicator, the compiler being configured to:

recognize the first subarea of the first computer program sequence and the second subarea by means of the at least one indicator;

select instructions from a set of instructions of the second computer program sequence to map a functionality of the first computer program sequence to the second computer program sequence, the set of instructions comprising instructions of a first security category and instructions of a second security category, and wherein the functionality of the first computer program sequence is realizable by both only the instructions of the first security category as well as only the instructions of the second security category, and wherein the selector is formed to select only instructions of the first security category for mapping a functionality of the first subarea and to select only instructions of the second security category or instructions of the first and second security categories for mapping a functionality of the second subarea; and generate the second computer program sequence from the instructions.

2. The compiler according to claim 1, wherein the first security level is associated with an area of the first computer program sequence requiring a high security requirement due to a critical functionality, the second security level is associated with a subarea of the first computer program sequence requiring less high a security requirement due to an uncritical functionality, and an instruction of the first security category being a secure instruction and an instruction of the second security category being an insecure instruction.

3. The compiler according to claim 1, wherein the instructions of the first security category and the instructions of the second security category form subsets of the set of instructions not overlapping with each other.

4. The compiler according to claim 1, wherein the instructions of the first security category and the instructions of the second security category form subsets of the set of instructions overlapping with each other.

5. The compiler according to claim 1, wherein the instructions of the first security category are less susceptible to deterministic attacks than the instructions of the second security category.

6. The compiler according to claim 1, wherein the instructions of the second security category execute register accesses.

7. The compiler according to claim 1, configured to insert an additional instruction into the second computer program sequence when recognizing the at least one indicator, which enables a secure mode in an executer suitable for executing the second computer program sequence.

8. The compiler according to claim 7, further comprising a temporary memory configured so that enabling the secure mode includes disabling the temporary memory.

9. The compiler according to claim 7, wherein the additional instruction describes a control register of the executer.

10. The compiler according to claim 1, wherein the first computer program sequence corresponds to a high-level language computer program and a subarea of the first computer program sequence represents a function or a module of the high-level language computer program.

11. The compiler according to claim 1, wherein the first subarea realizes a functionality of a decryption algorithm or an encryption algorithm, and wherein the second subarea realizes a functionality of a data reception routine.

12. The compiler according to claim 1, wherein the instructions of the first and second security categories are assembler instructions.

13. The compiler according to claim 1, wherein the first computer program sequence comprises another subarea of another security level identified by another indicator, and the compiler is configured to recognize the other subarea of the first computer program sequence by means of the other indicator, and wherein the set of instructions comprises other instructions of another security category, and the compiler is configured to select only instructions of the other security category for mapping a functionality of the other subarea.

14. A method for generating a second computer program sequence being a machine program executable by a processor, from a first computer program sequence, comprising, performed by a processor comprising a hardware implementation:

providing the first computer program sequence which comprises a first subarea of a first security level and a second subarea of a second security level distinguishable from the first subarea by at least one indicator;

recognizing the first subarea of the first computer program sequence and the second subarea by means of the at least one indicator;

selecting instructions from a set of instructions of the second computer program sequence to map a functionality of the first computer program sequence to the second computer program sequence, the set of instructions comprising instructions of a first security category and instructions of a second security category, and wherein the functionality of the first computer program sequence is realizable by both the instructions of the first security category as well as the instructions of the second security category, such that only instructions of the first security category are selected for mapping a functionality of the first subarea and instructions of the second security category or instructions of the first and second security categories are selected for mapping a functionality of the second subarea; and generating the second computer program sequence from the instructions selected by the selector.

15. A non-transitory computer-readable storage medium having stored thereon a computer program comprising a computer program code for performing a method for generating a second computer program sequence being a machine program executable by a processor, from a first computer program sequence, including: providing the first computer program sequence, which comprises a first subarea of a first security level and a second subarea of a second security level distinguishable from the first subarea by at least one indicator; recognizing the first subarea of the first computer program sequence and the second subarea by means of the at least one indicator; selecting instructions from a set of instructions of the second computer program sequence to map a functionality of the first computer program sequence to the second computer program sequence, the set of instructions comprising instructions of a first security category and instructions of a second security category, and wherein the functionality of the first computer program sequence is realizable by both only the instructions of the first security category as well as only the instructions of the second security category, such that only instructions of the first security category are selected configured to map a functionality of the first subarea and instructions of the second security category or instructions of the first and second security categories are selected configured to map a functionality of the second subarea; and generating the second computer program sequence from the instructions selected by the selector, when the computer program runs on a computer.

16. A processor configured to:
receive a first computer program sequence;
generate a second computer program sequence being a machine program executable by a processor, from a first computer program sequence, the first computer program sequence comprising a first subarea of a first security level and a second subarea of a second security level distinguishable from the first subarea by at least one indicator, comprising:
recognize the first subarea of the first computer program sequence and the second subarea by means of the at least one indicator;
select instructions from a set of instructions of the second computer program sequence to map a functionality of the first computer program sequence to the second computer program sequence, the set of instructions comprising instructions of a first security category and instructions of a second security category, and wherein the functionality of the first computer program sequence is realizable by both only the instructions of the first security category as well as only the instructions of the second security category, wherein the selector is formed to select only instructions of the first security category for mapping a functionality of the first subarea and to select only instructions of the second security category or instructions of the first and second security categories for mapping a functionality of the second subarea;
generate the second computer program sequence from the instructions selected by the selector; and
execute the instructions of the second computer program sequence;
wherein the set of instructions comprises machine instructions executable by the processor.

17. A compiler configured to generate a second computer program sequence from a first computer program sequence, the first computer program sequence comprising a first subarea of a first security level and a second subarea of a second security level distinguishable from the first subarea by at least an indicator, configured to:
recognize the first subarea of the first computer program sequence and the second subarea by means of the at least one indicator;
select instructions from a set of instructions of the second computer program sequence to map a functionality of the first computer program sequence to the second computer program sequence, the set of instructions comprising instructions of a first security category and instructions of a second security category, the functionality of the first computer program sequence being realizable by both only instructions of the first security category and only instructions of the second security category, wherein the selector is formed to select only instructions of the first security category for mapping a functionality of the first subarea and to select only instructions of the second security category or instructions of the first and second security categories for mapping a functionality of the second subarea; and
generate the second computer program sequence from the instructions selected by the selector,
wherein program counter relative jump instructions are assigned to the first security category and indirect jump instructions are assigned to the second security category, wherein the instructions of the first and second security category are non-overlapping sub-sets of the set of instructions.

18. A method for generating a second computer program sequence from a first computer program sequence, including, performed by a processor comprising a hardware implementation:
providing the first computer program sequence, which comprises a first subarea of a first security level and a second subarea of a second security level distinguishable from the first subarea by at least one indicator;
recognizing the first subarea of the first computer program sequence and the second subarea by means of the at least one indicator;
selecting instructions from a set of instructions of the second computer program sequence to map a functionality of the first computer program sequence to the second computer program sequence, the set of instructions comprising instructions of a first security category and instructions of a second security category, the functionality of the first computer program sequence being realizable by both only instructions of the first security category and only instructions of the second security category, and only instructions of the first security category being selected for mapping a functionality of the first subarea and instructions of the second security category or instructions of the first and second security categories being selected for mapping a functionality of the second subarea; and
generating the second computer program sequence from the instructions selected by the selector,
wherein program counter relative jump instructions are assigned to the first security category and indirect jump instructions are assigned to the second security category, wherein the instructions of the first and second security category are sub-sets of the set of instructions, with the program counter relative jump instructions and the indirect jump instructions not being within an overlap set of the instructions of the first and second category.

19. The non-transitory computer-readable storage medium according to claim 15, wherein program counter relative jump instructions are assigned to the first security category and indirect jump instructions are assigned to the second security category, wherein the instructions of the first and second security category are non-overlapping sub-sets of the set of instructions.

20. The compiler according to claim 1, wherein the second computer program sequence is configured to be executed on a processor comprising a CPU and a cache memory configured to cache data, but also supporting a write-through mechanism according to which the caching of data by the cache memory is inhibited, and, wherein the compiler is configured to, upon recognition of the first subarea of the first computer program sequence, insert an additional instruction into the second computer program sequence which is configured to activate the write-through mechanism, or, upon recognition of the second subarea of the first computer program sequence, insert an additional instruction into the second computer program sequence which is configured to deactivate the write-through mechanism, so that in executing the first subarea, no data is cached by the cache memory, while data is cached by the cache memory in executing the second subarea.

21. The method according to claim 14, wherein the second computer program sequence is configured to be executed on a processor comprising a CPU and a cache memory configured to cache data, but also supporting a write-through mechanism according to which the caching of data by the cache memory is inhibited, and wherein the compiler is configured to, upon recognition of the first subarea of the first computer program sequence, insert an additional instruction into the second computer program sequence which is configured to activate the write-through mechanism, or, upon recognition of the second subarea of the first computer program sequence, insert an additional instruction into the second computer program sequence which is configured to deactivate the write-through mechanism, so that in executing the first subarea, no data is cached by the cache memory, while data is cached by the cache memory in executing the second subarea.

22. The compiler according to claim 1, wherein the indicator does not participate in defining the functionality of the first computer program sequence and is disjoint to the first and second subareas.

23. The compiler according to claim 1, wherein the first computer program sequence is a non-executable code not being executable be the processor.

* * * * *